United States Patent
Zhang et al.

(12)

(10) Patent No.: US 10,932,196 B2
(45) Date of Patent: Feb. 23, 2021

(54) METHOD FOR REDUCING POWER CONSUMPTION OF MOBILE TERMINAL, STORAGE MEDIUM AND MOBILE TERMINAL

(71) Applicant: GUANGDONG OPPO MOBILE TELECOMMUNICATIONS CORP., LTD., Guangdong (CN)

(72) Inventors: Qiang Zhang, Guangdong (CN); Mingqiang Guo, Guangdong (CN); Rendong Shi, Guangdong (CN); Tong Han, Guangdong (CN); Hao Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/723,457

(22) Filed: Dec. 20, 2019

(65) Prior Publication Data
US 2020/0137689 A1  Apr. 30, 2020

Related U.S. Application Data

(63) Continuation of application No. PCT/CN2018/090502, filed on Jun. 8, 2018.

(30) Foreign Application Priority Data

Jul. 28, 2017  (CN) .......................... 201710633671.5

(51) Int. Cl.
*H04W 52/02* (2009.01)

(52) U.S. Cl.
CPC ..... *H04W 52/0254* (2013.01); *H04W 52/027* (2013.01); *H04W 52/0264* (2013.01)

(58) Field of Classification Search
CPC .............. G06F 1/3265; G06F 3/04883; H04M 1/72563; H04M 1/72577; H04M 2250/22; H04M 52/0254
See application file for complete search history.

(56) References Cited

U.S. PATENT DOCUMENTS

| | | | |
|---|---|---|---|
| 2015/0074615 A1* | 3/2015 | Han ..................... | G06F 3/04883 715/863 |
| 2015/0135108 A1* | 5/2015 | Pope ..................... | G06F 3/0481 715/767 |

(Continued)

FOREIGN PATENT DOCUMENTS

| | | |
|---|---|---|
| CN | 103366107 A | 10/2013 |
| CN | 105094621 A | 11/2015 |

(Continued)

OTHER PUBLICATIONS

International search report issued in corresponding international application No. PCT/CN2018/090502, dated Aug. 23, 2018 (2 pages).

(Continued)

*Primary Examiner* — David Bilodeau (57) ABSTRACT

Disclosed in the embodiments of the present disclosure are a method and a device for reducing the power consumption of a mobile terminal, a storage medium and a mobile terminal. The method may include: acquiring, in a screen-off state, a fingerprint detected by a fingerprint recognition module; controlling, if the fingerprint is a non-unlocking fingerprint, a touch chip to output a touch sensing control signal to a touch display screen; finding, according to the fingerprint, a matching application program on which the user has rights to operate, and acquiring a set of blank screen gestures corresponding to the application program; and reporting, upon detection of a blank screen gesture belonging to the set of blank screen gestures, a blank screen gesture (Continued)

in a screen-off state, acquiring a fingerprint detected by a fingerprint recognition module — 110 if the fingerprint is a non-unlocking fingerprint, controlling a touch chip to output a touch sensing control signal to a touch display screen, wherein the touch sensing control signal is configured to enable the touch display screen to enter a working mode for detecting blank screen gestures — 120 according to the fingerprint, matching an application program on which a user has an operation right, and acquiring a set of blank screen gestures corresponding to the application program — 130 reporting a blank screen gesture event to an application layer upon detection of a blank screen gesture belonging to the set of blank screen gestures to execute an operation corresponding to the blank screen gesture — 140 event to an application layer to execute an operation corresponding to the blank screen gesture.

20 Claims, 6 Drawing Sheets

(56) References Cited

U.S. PATENT DOCUMENTS

| | | | |
|---|---|---|---|
| 2015/0199554 A1 | 7/2015 | Merrell et al. | |
| 2015/0324565 A1 | 11/2015 | Park et al. | |
| 2016/0379039 A1 | 12/2016 | Dagan et al. | |
| 2017/0031542 A1* | 2/2017 | Ryu | G06F 3/0482 |
| 2017/0344733 A1* | 11/2017 | Woodhull | G06K 9/0002 |
| 2019/0188363 A1* | 6/2019 | VanBlon | G06K 9/00013 |
| 2020/0005732 A1* | 1/2020 | Wang | G06F 9/4418 |

FOREIGN PATENT DOCUMENTS

| | | |
|---|---|---|
| CN | 105278863 A | 1/2016 |
| CN | 105354474 A | 2/2016 |
| CN | 105373741 A | 3/2016 |
| CN | 105425941 A | 3/2016 |
| CN | 106327193 A | 1/2017 |
| CN | 106874725 A | 6/2017 |
| CN | 107395889 A | 11/2017 |
| EP | 3054394 A1 | 8/2016 |
| EP | 3196738 A1 | 7/2017 |
| WO | 2017118332 A1 | 7/2017 |

OTHER PUBLICATIONS

First Office Action from China patent office in a counterpart Chinese patent Application 201710633671.5, dated Apr. 2, 2019 (9 pages).
European search report issued in corresponding European application No. 18838821.9 dated Apr. 24, 2020.
Gesture Elicitation & Recognition; Enabling Always-On Touch Gestures for Fast Mobile Access From the Device Standby Mode; Hao Lu and Yang Li; 10 pages.

* cited by examiner

METHOD FOR REDUCING POWER CONSUMPTION OF MOBILE TERMINAL, STORAGE MEDIUM AND MOBILE TERMINAL

CROSS-REFERENCE TO RELATED APPLICATION(S)

The present application is a continuation application of International Patent Application No. PCT/CN2018/090502, filed on Jun. 8, 2018, which claims priority to Chinese Patent Application No. 201710633671.5, filed on Jul. 28, 2017, the entire contents of both of which are hereby incorporated by reference in their entireties.

TECHNICAL FIELD

Embodiments of the present disclosure relate to the technology of mobile terminals, for example, relate to a method for reducing power consumption of a mobile terminal, a storage medium, and a mobile terminal.

BACKGROUND

Current mobile terminals, such as smart phones, PDAs, tablets, or handheld game consoles, are generally designed to have a touch display structure, so as to provide a touch input method and make users' operations be more convenient.

Blank screen gesture is a function of current smart phones, which is distinctive and has a futuristic sense of science and technology. When the blank screen gesture function is turned on, a gesture operation applied on a touch display screen can be detected even though a smart phone is in a standby blank screen state, such that the corresponding function or software inside the phone is triggered. However, current blank screen gesture processing processes have defects, resulting in higher power consumption of mobile terminals and lowering battery lives of mobile terminals.

SUMMARY

The following is the summary of the subject described in detail by the present disclosure. The summary is not intended to limit the protection scope of the claims.

Embodiments of the present disclosure provide a method for reducing power consumption of a mobile terminal, a storage medium, and a mobile terminal, which can effectively reduce power consumption of a mobile terminal.

In a first aspect, an embodiment of the present disclosure provides a method for reducing power consumption of a mobile terminal, comprising: in a screen-off state, acquiring a fingerprint detected by a fingerprint recognition module; if the fingerprint is a non-unlocking fingerprint, controlling a touch chip to output a touch sensing control signal to a touch display screen, wherein the touch sensing control signal is configured to enable the touch display screen to enter a working mode for detecting blank screen gestures; according to the fingerprint, matching an application program on which a user has an operation right, and acquiring a set of blank screen gestures corresponding to the application program; reporting a blank screen gesture event to an application layer upon detection of a blank screen gesture belonging to the set of blank screen gestures to execute an operation corresponding to the blank screen gesture.

In a second aspect, an embodiment of the present disclosure provides a computer readable storage medium, which stores a computer program, wherein the program, when being executed by a processor, implements the method for reducing power consumption of a mobile terminal according to the embodiment of the present disclosure.

In a third aspect, an embodiment of the present disclosure provides a mobile terminal, comprising: a processor; a fingerprint recognition module configured to detect a fingerprint input by a user; a memory configured to store association relationships among blank screen gestures, fingerprints, and application programs, and store a computer program being executable in the processor; a touch display screen including a touch chip and configured to detect a blank screen gesture and display a gesture track of the blank screen gesture; wherein, the touch chip is configured to output a touch sensing control signal to the touch display screen under control of the processor; and the processor is configured to implement the method for reducing power consumption of a mobile terminal according to the embodiment of the present disclosure when executing the computer program.

In the solution of reducing power consumption of a mobile terminal provided by the embodiment of the present disclosure, a fingerprint detected by a fingerprint recognition module is acquired in a screen-off state; if the fingerprint is a non-unlocking fingerprint, a touch chip is controlled to output a touch sensing control signal to a touch display screen; according to the fingerprint, an application program on which a user has an operation right is matched, and a set of blank screen gestures corresponding to the application program is acquired; upon detection of a blank screen gesture belonging to the set of blank screen gestures, a blank screen gesture event is reported to an application layer, such that the application layer is triggered to execute an operation corresponding to the blank screen gesture. By adopting the above technical solution, power consumption of a mobile terminal can be reduced effectively, and a battery life can be extended.

After reading and appreciating the drawings and the detailed description, other aspects can be appreciated.

DETAILED DESCRIPTION

The present disclosure will be further described in detail in accompany with drawings and embodiments. It can be understood that the specific embodiments described here are only intended to illustrate the present disclosure, but not to limit the present disclosure.

Before discussing the example embodiments in more detail, it should be noted that some example embodiments are described as processes or methods depicted as flow charts. Although the flow charts describe various steps as a sequential process, many of the steps can be implemented in parallel, concurrently, or simultaneously. In addition, the order of the steps can be rearranged. The process may be terminated when its operation is completed, but may also have additional steps not included in the drawings. The process may correspond to methods, functions, procedures, subroutines, subprograms, and the like.

A blank screen gesture function is such a function: when a mobile terminal (such as a smart phone) is in a screen-off and sleep state, a touch display screen operates in a low power consumption state to detect a touch operation applied on the touch display screen in the screen-off state, determine a blank screen gesture corresponding to the touch operation, and according to the blank screen gesture, enable a certain function of the smart phone or enable an application program corresponding to a type of the blank screen gesture set in advance. In order to facilitate understanding of the blank screen gesture function, a flow from detecting a blank screen gesture in a screen-off state to activating an application program corresponding to the blank screen gesture by an application layer is described as follows. The process includes: storing gesture data corresponding to the blank screen gesture into a preset node of a driver layer, wherein the gesture data includes a gesture coordinate and a gesture type; performing blank screen gesture data validity determination by the driver layer; if valid, performing blank screen gesture event dispatch by a frame layer; after the application layer receives the blank screen gesture event, by the application layer, reading the gesture coordinates from the preset node in the driver layer calculating an animation track of the blank screen gesture according to the gesture coordinates and the gesture type, and sending the animation track data to a frame buffer (FrameBuffer) to refresh the animation track into a display screen to display according to a set screen refresh rate; afterwards, performing an operation of activating the application program corresponding to the blank screen gesture by the application layer.

At present, a touch chip outputs a touch sensing control signal of which a frequency is lower than a scanning frequency in a normal screen-bright state to a touch display screen, so that small current flows through a surface of the touch display screen, and thus the whole screen of the touch display screen is in a low power consumption state for detecting a blank screen gesture. However, in some scenarios, the user may input no blank screen gesture for a long time, for example, in a conference scene, a nighttime rest scene, and so on. In the related art, a terminal does not adjust the power consumption of a touch display screen according to usage of a user, resulting a short battery life of the terminal. Solutions for detecting blank screen gestures provided by embodiments of the present disclosure can well solve the above problem that the battery life of the terminal is short.

Figure 1:
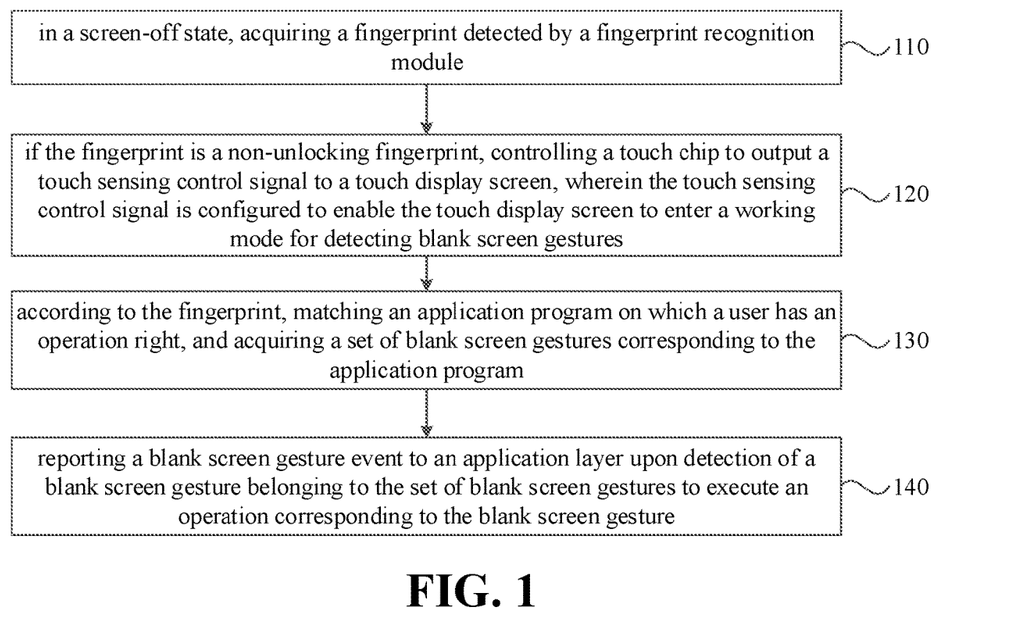
FIG. 1 is a flow chart of a method for reducing power consumption of a mobile terminal provided by an embodiment of the present disclosure.

FIG. 1 is a flow chart of a method for reducing power consumption of a mobile terminal provided by an embodiment of the present disclosure. The method can be executed by a device for reducing power consumption of a mobile terminal, wherein, the device can be implemented by software and/or hardware, and generally can be integrated in a mobile terminal. As shown in FIG. 1, the method comprises an operation 110, an operation 120, an operation 130, and an operation 140.

In the operation 110, in a screen-off state, a fingerprint detected by a fingerprint recognition module is required.

Wherein, the fingerprint includes a fingerprint pattern. The fingerprint recognition module includes a press-type fingerprint recognition module or a touch-type fingerprint recognition module. For the press-type fingerprint recognition module, when the mobile terminal is in the screen-off state, it can detect and recognize the fingerprint based on a touch operation of a user. It should be noted that, at this time, a pressing pressure of the touch operation input by the user is insufficient to press the press-type fingerprint recognition module. Otherwise, after the press-type fingerprint recognition module is pressed, the display screen will be triggered to light. For the touch-type fingerprint recognition module, when the mobile terminal is in the screen-off state, it can detect and recognize a fingerprint input by a user.

If a blank screen gesture function has been enabled and the mobile terminal is in the screen-off state, the fingerprint recognition module is controlled to enter a working mode for detecting fingerprints, and the touch display screen is controlled to enter a non-working mode which cannot detect blank screen gestures (it can be considered as a sleep state, there is no input touch sensing control signal, that is, touch operations applied on the touch display screen cannot be detected), such that the problem of high power consumption of the mobile terminal, which is caused by continuously providing the touch sensing control signal to the whole screen of the touch display screen, is avoided.

In one embodiment, an application layer can determine whether the blank screen gesture function is enabled according to a configuration operation of a user. For example, in an application scenario in which a user configures a blank screen gesture, if the user clicks a configuration option and selects the blank screen gesture function, a display interface of the terminal switches to a blank screen gesture function configuration interface. On the blank screen gesture function configuration interface, the user can click to enable the blank screen gesture function and set blank screen gestures which are enabled. At this time, the application layer modifies the value of the preset identifier representing the on and off state of the blank screen gesture function to indicate that the blank screen gesture function is currently enabled. Since the display screen sends a screen-off broadcast when the screen is turned off, it can be determined that the mobile terminal is in the screen-off state according to the screen-off broadcast. When determining that the blank screen gesture function has been enabled and the mobile terminal is in the screen-off state, the mobile terminal outputs a driving signal to the fingerprint recognition module to enable the fingerprint recognition module to enter the working mode, but does not output any touch sensing control signal to the touch display screen, such that the touch display screen is in a sleep state in which blank screen gestures cannot be detected.

In the operation 120, if the fingerprint is a non-unlocking fingerprint, a touch chip is controlled to output a touch sensing control signal to a touch display screen, wherein the touch sensing control signal is configured to enable the touch display screen to enter a working mode for detecting blank screen gestures.

Wherein, the touch sensing control signal is a driving signal controlling the touch display screen to work and being capable of detecting blank screen gestures, that is, the touch sensing control signal is configured to enable the touch display screen to enter a working mode for detecting blank screen gestures. A fingerprint template is a fingerprint set formed by fingerprints recorded by a user in advance. After acquiring the fingerprint detected by the fingerprint recognition module, the fingerprint is compared with the fingerprint template stored in the mobile terminal in advance, and whether the fingerprint is an unlocking fingerprint is determined according to the comparison result. For example, a fingerprint pattern of the fingerprint is matched with fingerprint patterns in the fingerprint template stored in advance, and whether there exists a template fingerprint pattern matching with the fingerprint is determined. If existing, it is determined that the fingerprint is an unlocking fingerprint, and an unlocking operation is executed based on the unlocking fingerprint; otherwise, it is determined that the fingerprint is a non-unlocking fingerprint, at this time, a touch chip is controlled by a drive layer to output a touch sensing control signal to the touch display screen.

In the operation 130, according to the fingerprint, an application program on which a user has an operation right is matched, and a set of blank screen gestures corresponding to the application program is required. The user is the user having the fingerprint.

The mobile terminal provides a right setting option for users, and users can set application programs that can be operated by different users through the right setting option. In one embodiment, a user can record a fingerprint as a fingerprint template when first using the blank screen gesture function and select application programs associated with the fingerprint template. For example, for the owner himself/herself, he/she has the greatest operation right, and can operate all application programs installed in the terminal. Therefore, after the owner himself/herself records a fingerprint, all application programs installed in the terminal are designated as application programs corresponding to the fingerprint recorded by the owner. For a child, he/she has operation right of some application programs. After the child records a fingerprint, the owner designates some operable application programs for him/her, therefore, these application programs are application programs corresponding to the fingerprint recorded by the child. For strangers recording no fingerprint in the mobile terminal, they only have operation right of turning on a camera to photograph, or turning on application programs relating no user privacy, such as a flashlight application program. Association relationships between fingerprint templates and application programs having operation right can be recorded by the form of a first white list.

It can be understood that application programs which are operable for strangers can be set by users, and can also be set by system default.

For establishing association relationships between blank screen gestures and application programs or mobile phone functions in advance, a second white list can be set to store the association relationships between blank screen gestures and application programs (e.g., a process number or an installation package name) or mobile phone functions (e.g., working mode switches such as mobile phone wake-up, a conference mode, or a standard mode, etc.). It can be understood that there are many kinds of methods for establishing association relationships between blank screen gestures and application programs, and are not limited by embodiments of the present disclosure. For example, it is possible to set a quick start function for a set function or a set application of a mobile terminal before the mobile terminal leaves the factory, and by inputting a set gesture, it is possible to directly execute the set function or actuate the set application in a screen-off state. Taking the flashlight as an example, before the mobile terminal leaves the factory, the flashlight is set to have a quick start function in advance, and the flashlight can be turned on in a screen-off state by inputting a blank screen gesture "O". For another instance, the mobile terminal provides a blank screen gesture configuration function, when a user enables the blank screen gesture configuration function, the user is indicated to select an application program requiring setting a quick start function, and input or select a blank screen gesture corresponding to the application program, such that an association relationship between the blank screen gesture and the application program is established.

According to a currently detected non-unlocking fingerprint which is successfully matched with a fingerprint template, inquiring an association relationship between the fingerprint template and application programs can determine application programs that can be operated by the user having the fingerprint. In one embodiment, if the fingerprint is successfully matched with a fingerprint template stored in advance, the first white list storing the association relationship between the fingerprint template and application programs is inquired, and application programs on which the user has operation right are determined; if the fingerprint fails to match with a fingerprint template stored in advance, preset application programs are used as application programs on which the user has operation right. For example, the first white list is inquired according to a currently detected fingerprint successfully matching with a fingerprint template, and it is determined that the user has operation right to a camera application, instant messaging applications (such as Wechat, QQ, etc.) and shopping applications (such as Taobao, Jingdong, etc.). For another instance, when a currently detected fingerprint fails to match with a fingerprint template stored in advance, it is determined that the user having the fingerprint only has operation right to the camera application. It should be noted that, when the currently detected fingerprint fails to match with the fingerprint template stored in advance, the user having the fingerprint cannot directly enter a photo gallery through a camera application interface after enabling the camera application. For example, if the user having the fingerprint wants to enter the photo gallery, a dialog box is displayed to indicate the user to input a fingerprint.

According to the application programs with operation right, the second white list is inquired to determine a set of blank screen gestures corresponding to the application programs that can be operated by the user.

In the operation S140, a blank screen gesture event is reported to an application layer upon detection of a blank screen gesture belonging to the set of blank screen gestures to execute an operation corresponding to the blank screen gesture.

If a touch operation on the touch display screen is detected, a blank screen gesture type corresponding to the touch operation can be recognized by a drive layer, and the set of blank screen gestures is inquired according to the recognized blank screen gesture type to determine whether the currently detected blank screen gesture is a blank screen gesture in the set of blank screen gestures. If yes, the drive layer reports the blank screen gesture to the application layer.

In one embodiment, when a blank screen gesture is detected, a touch chip stores gesture data corresponding to the blank screen gesture into a set register, and sends an interruption wake-up signal to a kernel layer. When receiving the interruption wake-up signal, the kernel layer executes a system wake-up operation. After the system is waked up, the kernel later calls an interruption processing function of the drive layer to execute, reads the gesture data from the set register of the touch chip, and stores the gesture data in a preset node of the drive layer. According to a recognized blank screen gesture type, the set of blank screen gestures is inquired, and whether the currently detected blank screen gesture is a blank screen gesture in the set of blank screen gestures is determined. For example, the drive layer recognizes that the blank screen gesture type is "O" according to read gesture data. According to the recognized e blank screen gesture type "O", the set of blank screen gestures is inquired. If there exists a blank screen gesture "O" in the blank screen gesture type, it is determined that the currently detected blank screen gesture belongs to the set of blank screen gestures. When the currently detected blank screen gesture belongs to the set of blank screen gestures, a blank screen gesture event is reported to the application layer to enable the application layer to execute an operation corresponding to the currently detected blank screen gesture.

Figure 2:
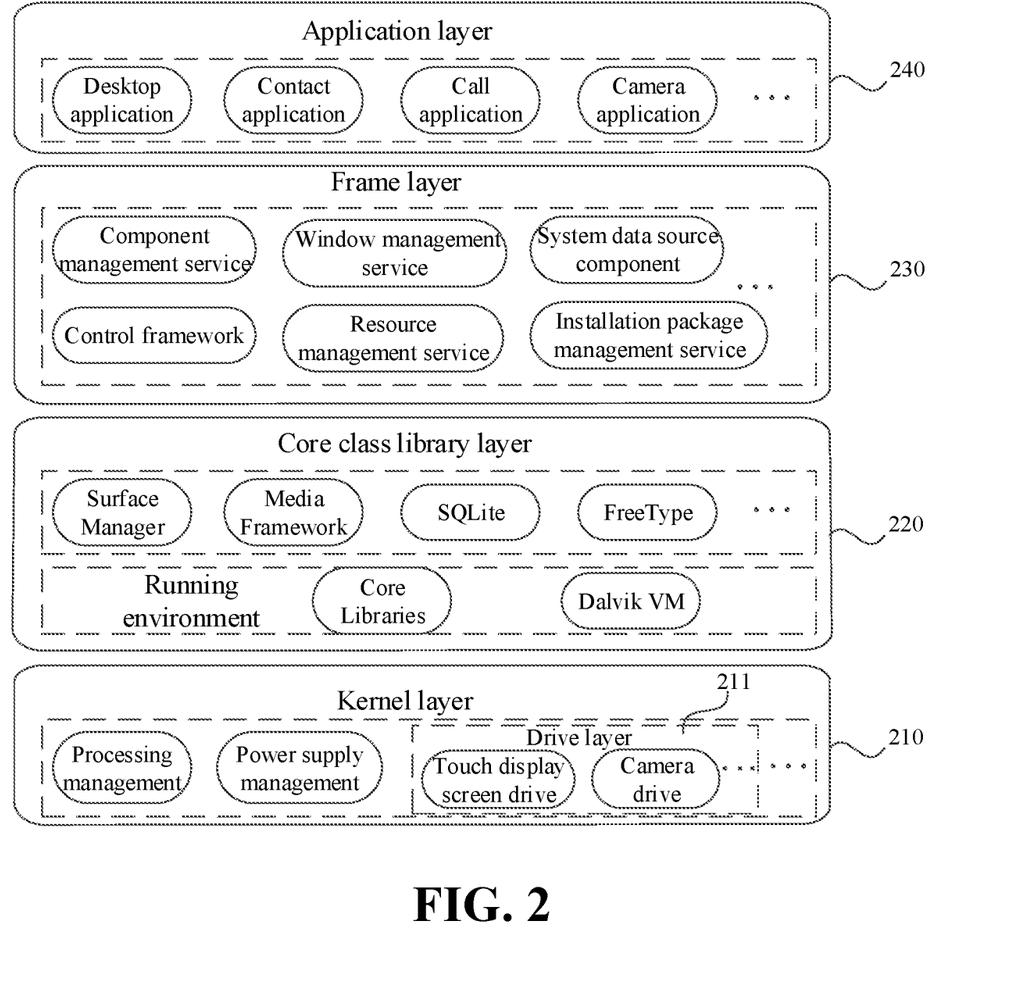
FIG. 2 is a schematic diagram of an operation system framework provided by an embodiment of the present disclosure.

FIG. 2 is a schematic diagram of an operation system framework provided by an embodiment of the present disclosure. Taking a mobile terminal shown in FIG. 2 as an example, an execution flow of a blank screen gesture function provided by an embodiment of the present disclosure is described. As shown in FIG. 2, the operation system framework, from bottom to top, includes a kernel layer 210, a core class library layer 220, a frame layer 230, and an application layer 240. Wherein, the kernel layer 210 provides core system services, which include safety, memory management, process management, network protocol stack, hardware drive, etc. Wherein, the hardware drive in the kernel layer 210 is recorded as a drive layer 211, the drive layer 211 includes a touch display screen drive, a camera drive, etc. The core class library layer 220 includes Runtime and Libraries. Wherein, the Runtime provides most functions that are usable in Java programming language core class libraries, which comprise Core Libraries and Dalvik VM. Each application program is a real example in the Dalvik VM and operates in its own process. The Libraries are used by various components of the operation system and include the following functions: Media Framework, Surface Manager, SQlite (relation database engine), FreeType (bitmap and vector font rendering), and so on, and the various functions are exposed to developers to use through the frame layer 230 of the operation system. The frame layer 230 provides a series of class libraries required by developing application programs, such that developers can perform quick application program developments, facilitate reuse of components, and can also realize personalized extension through inheritance; provided services include a component management service, a window management service, a system data source component, a control framework, a resource management service, an installation package management service, and so on. The application layer 240 includes various application programs directly interacting with users, or service programs written by Java language and running in the background, which include programs such as desktop applications, contact applications, call applications, camera applications, photo browsers, games, maps, web browsers, and so on, and other application programs developed by developers.

In one embodiment, after a blank screen gesture function is enabled, the touch chip generates a wake-up signal when detecting a blank screen gesture and sends the wake-up signal to the kernel layer. By the wake-up signal, the kernel layer is triggered to execute a system wake-up operation. After the system is waked up, the kernel layer calls a drive layer interruption processing function to execute, the drive layer reads gesture data in the touch chip through the interruption processing function, and stores read gesture data in a preset node of the drive layer. Wherein, the touch chip is configured to output a touch sensing control signal to the touch display screen, so as to detect touch operations, recognize gesture coordinates of blank screen gestures acting on the touch display screen, and stores the gesture coordinates as the gesture data in its own register. The preset node can be a file node, for example, can be a virtual file node under a proc-D content. After data reading is completed, the drive layer determines validity of the gesture data, there are many kinds of methods for determining validity, and this embodiment does not make specific limitation. For example, the drive layer determines a gesture type according to a gesture coordinate included in the gesture data, and stores the determined gesture type as gesture data in the preset node. If the gesture type is not a preset blank screen gesture, it is determined that the gesture data is invalid. For another instance, the drive layer counts the number of the gesture data, and determines whether the number meets requirement of drawing a preset blank screen gesture; if no, it is determined that the gesture data is invalid. When the data is valid, the drive layer reports a blank screen gesture event. The blank screen gesture event is transmitted to the frame layer through the core class library layer, and is distributed by the frame layer and reaches the application layer. The application layer, when receiving the blank screen gesture event, reads the gesture data from the preset node of the drive layer. After the gesture data is completely ready, a blank screen gesture track is calculated according to the gesture coordinate included in the gesture data, and the blank screen gesture track is drawn on the display screen to display. Afterwards, the application layer, based on the gesture type in the read gesture data, turns on an application program corresponding to the gesture type. Wherein, the gesture type can be a gesture configured to realize a certain function, which is set in the mobile terminal in advance, and can also be a gesture customized by a user. For example, the gesture type can be O representing turning on a camera; for another instance, the gesture type can be V representing turning on a flashlight, etc.

It can be understood that the execution flow of the blank screen gesture function is not limited to the methods listed in this embodiment. For example, it is also possible that: a blank screen gesture event is reported once the system is waked up, the kernel layer calls the drive layer interruption processing function to execute, the drive layer reads gesture data in the touch chip through the interruption processing function, and stores the gesture data in a preset node of the drive layer; when the blank screen gesture event is reported, operations of reading the gesture data by the drive layer and determining the gesture type according to the gesture data are execute in parallel; for example, the drive layer acquires the gesture data in the preset node, makes curve fitting for the gesture data to obtain a gesture type being most similar to the blank screen gesture, and stores the gesture type also as the gesture data in the preset node. Wherein, curve fitting is a data processing method, that is, using continuous curves to approximately depict or simulate function relationships among coordinates represented by discrete points on a plane. When the application layer receives the blank screen gesture event, whether the gesture data in the preset node is completely ready is detected according to a set cycle. When being completely ready, the application layer reads the gesture data in the preset node. If the gesture data is successfully read and valid, a blank screen gesture track is calculated according to a gesture coordinate included in the gesture data, and the blank screen gesture track is drawn on the display screen to display. Afterwards, based on a gesture type in the read gesture data, the application layer turns on an application program corresponding to the gesture type.

The solution for reducing power consumption of a mobile terminal provided by the embodiment of the present disclosure comprises: in a screen-off state, acquiring a fingerprint detected by a fingerprint recognition module; if the fingerprint is a non-unlocking fingerprint, controlling a touch chip to output a touch sensing control signal to a touch display screen; according to the fingerprint, matching an application program on which a user has an operation right, and acquiring a set of blank screen gestures corresponding to the application program; upon detection of a blank screen gesture belonging to the set of blank screen gestures, reporting a blank screen gesture event to an application layer to trigger the application layer to execute an operation corresponding to the blank screen gesture. By adopting the above technical solution, the condition of increasing power consumption of the mobile terminal caused by continuous working of the touch display screen can be avoided from occurring; at the same time, only a blank screen gesture corresponding to an application program matching with a current fingerprint can triggering report of a blank screen gesture event, so that the condition that the application layer triggers blank screen gesture events based on invalid blank screen gestures and executes gesture data reading operations, resulting in doing idle work, is further avoided from occurring. In this way, the power consumption of the mobile terminal can be effectively reduced, and a battery life can be extended.

Figure 3:
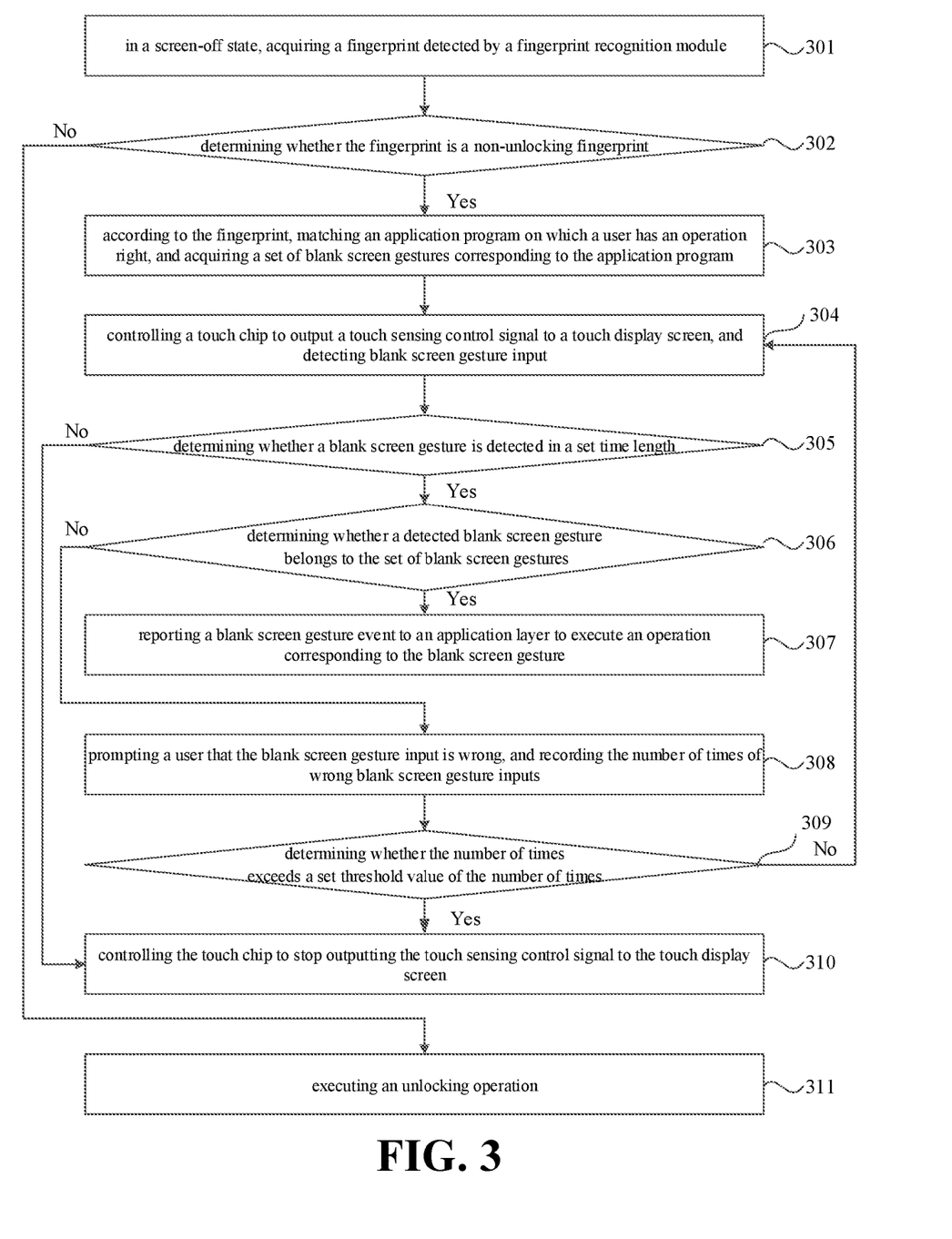
FIG. 3 is a flow chart of another method for reducing power consumption of a mobile terminal provided by an embodiment of the present disclosure.

FIG. 3 is a flow chart of another method for reducing power consumption of a mobile terminal provided by an embodiment of the present disclosure. As shown in FIG. 3, the method comprises operations 301 to 311.

In the operation 301, in a screen-off state, a fingerprint detected by a fingerprint recognition module is acquired.

In the operation 302, whether the fingerprint is a non-unlocking fingerprint is determined; if yes, the operation 303 is executed, otherwise, the operation 311 is executed.

The currently detected fingerprint is matched with an unlocking fingerprint set in advance, if matching succeeds, it is considered that the currently detected fingerprint is the unlocking fingerprint, and an unlocking operation is further executed based on the unlocking fingerprint; if matching fails, it is considered that the currently detected fingerprint is a non-unlocking fingerprint.

In the operation 303, according to the fingerprint, an application program on which a user has an operation right is matched, and a set of blank screen gestures corresponding to the application program is required. The user is a user having the fingerprint.

In the operation 304, a touch chip is controlled to output a touch sensing control signal to a touch display screen, and detecting blank screen gesture input.

A driver layer controls a touch chip to output a touch sensing control signal to a touch display screen, and activates the touch display screen according to the touch sensing control signal to make the touch display screen enter a working mode for detecting blank screen gestures. In this way, the touch display screen can detect blank screen gesture input.

In the operation 305, whether a blank screen gesture is detected in a set time length is determined; if yes, the operation 306 is executed; otherwise, the operation 310 is executed.

Wherein, the set time length is the longest tolerable time of the mobile terminal for a blank screen gesture detection operation. In the set time length, if no blank screen gesture acting on a touch display screen is detected, it is determined that there is no blank screen gesture input, therefore, blank screen gesture input is no longer detected. The set time can be set by system default, and can also be set by users themselves according to actual needs.

In one embodiment, when outputting the touch sensing control signal to touch display screen, a timer is started. Before a count value of the timer reaches the set time length, whether blank screen gesture input is detected is determined; if yes, the operation 306 is executed; otherwise, the operation 310 is executed.

In the operation 306, whether a detected blank screen gesture belongs to the set of blank screen gestures is determined; if yes, the operation 307 is executed; otherwise, the operation 308 is executed.

In the operation 307, a blank screen gesture event is reported to an application layer to execute an operation corresponding to the blank screen gesture.

In the operation 308, a user is prompted that the blank screen gesture input is wrong, and the number of times of wrong blank screen gesture inputs is recorded.

Wherein, the method for prompting a user that the blank screen gesture input is wrong can be vibration of the mobile terminal for a set number of times and/or sending set prompt sound. It can be understood that the methods for prompting a user that the blank screen gesture input is wrong listed above are examples but not limitations.

If a detected blank screen gesture does not belong to the set of blank screen gestures, the mobile terminal is controlled to vibrate a set number of times, so as to prompt a user that the currently input blank screen gesture is wrong. It is possible to indicate different error types by different vibration numbers of times. For example, twice vibrations of the mobile terminal indicate that the blank screen gesture is not a preset blank screen gesture, four times vibrations of the mobile terminal indicate that the user has no operation right to the application program corresponding to the blank screen gesture, and so on.

If the detected blank screen gesture does not belong to the set of blank screen gestures, further, a counter is started to record the number of times of wrong blank screen gesture inputs. When detecting a wrong blank screen gesture input, the counting value of the counter is controlled to add 1.

In the operation 309, whether the number of times exceeds a set threshold value of the number of times is determined; if yes, the operation 310 is executed; otherwise, the operation 304 is executed.

Wherein, the set threshold value of the number of times can be set by system default, and can also be set by users themselves according to actual needs.

If the number of times of wrong blank screen gesture inputs does not exceed the set threshold value of the number of times, the operation 304 is returned to execute, thereby continuing to detect blank screen gesture inputs.

In the operation 310, the touch chip is controlled to stop outputting the touch sensing control signal to the touch display screen.

When the number of times of wrong blank screen gesture inputs exceeds the set threshold value of the number of times, the application layer controls the touch chip to stop outputting the touch sensing control signal to the touch display screen, and thereby makes the touch display screen quit the working mode. In this way, the touch display screen is in a sleep state and avoids from inputting drive current to the touch display screen to keep the touch display screen working, so that power consumption of the mobile terminal is reduced.

In the operation 311, an unlocking operation is executed.

If the detected fingerprint is an unlocking fingerprint, executing an unlocking operation for the mobile terminal.

The solution for reducing power consumption of a mobile terminal provided by an embodiment of the present disclosure comprises: if no blank screen gesture input is detected in the set time length, controlling the touch chip to stop outputting the touch sensing control signal to the touch display screen; if a blank screen gesture input is detected in the set time length, and the blank screen gesture does not belong to the set of blank screen gestures, prompting a user that the blank screen gesture input is wrong, and recording the number of times of wrong blank screen gesture inputs; when the number of times exceeds the set threshold value of the number of times, controlling the touch chip to stop outputting the touch sensing control signal to the touch display screen, and thereby making the touch display screen quit the working mode. By adopting the above technical solution, the longest tolerable time is set for the blank screen gestures input by users, and the most tolerable number of times is set for the input wrong blank screen gestures, such that the condition that the touch display screen is activated for many times by the fingerprint recognition module, which results in that the service life of the fingerprint recognition module is affected, can be effectively avoided from occurring.

Figure 4:
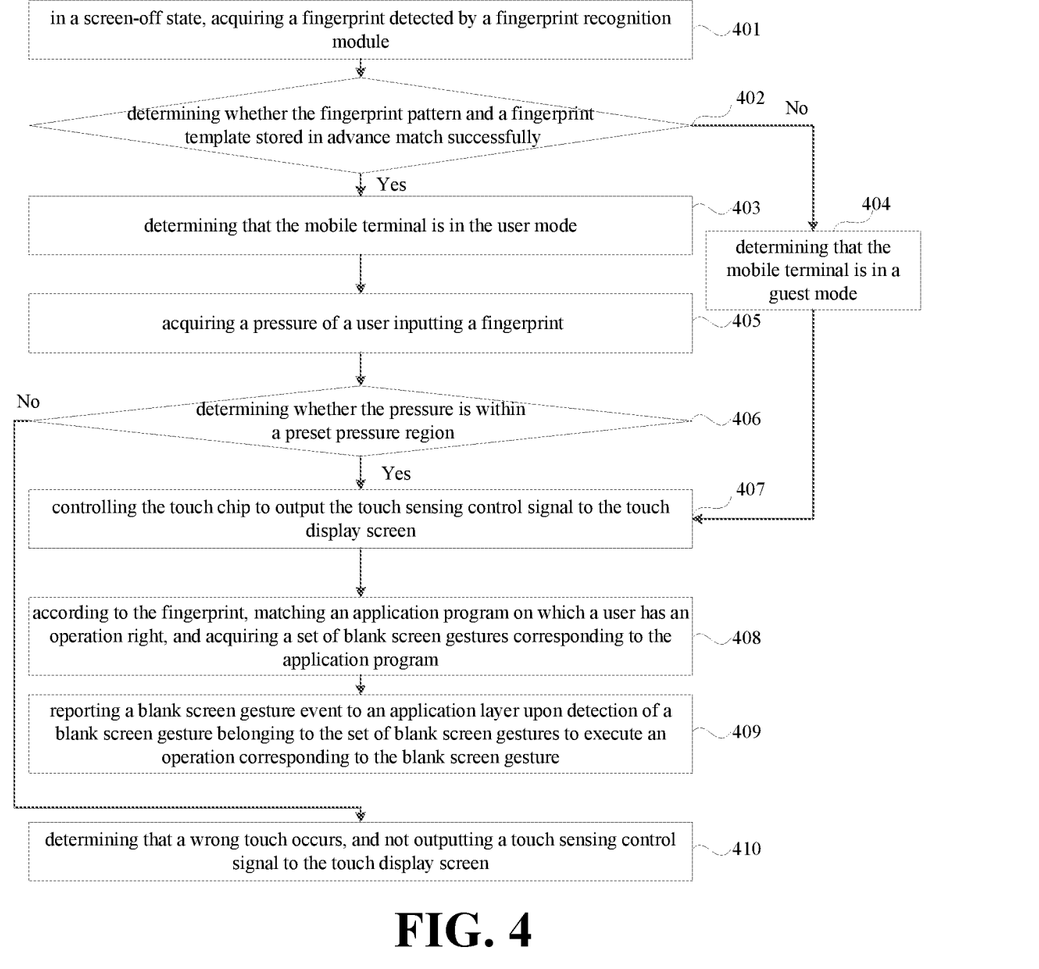
FIG. 4 is a flow chart of further another method for reducing power consumption of a mobile terminal provided by an embodiment of the present disclosure.

FIG. 4 is a flow chart of further another method for reducing power consumption of a mobile terminal provided by an embodiment of the present disclosure. As shown in FIG. 4, the method comprises operations 401 to 410.

In the operation 401, in a screen-off state, a fingerprint detected by a fingerprint recognition module is acquired.

In the screen-off state, the fingerprint recognition module and a pressure sensor are controlled to be in a working state. Wherein, the fingerprint recognition module is configured to detect fingerprints input by users, and the fingerprints include fingerprint patterns. The pressure sensor is configured to detect pressures of users inputting fingerprints. If a finger of a user contacts the fingerprint recognition module, a pressure of the user inputting a fingerprint is detected by the pressure sensor.

In the operation 402, whether the fingerprint pattern and a fingerprint template stored in advance match successfully is determined; if yes, the operation 403 is executed; otherwise, the operation 404 is executed.

Fingerprints recorded by users are stored in the mobile terminal in advance as the fingerprint template. It is possible to make the mobile terminal be in a user mode and a guest mode respectively according to whether the detected fingerprint belongs to the fingerprint template.

In the operation 403, that the mobile terminal is in the user mode is determined.

Wherein, in the user mode, application programs on which a user has operation right can be determined according to a fingerprint input by the user.

In the operation 404, that the mobile terminal is in a guest mode is determined.

Wherein, in the guest mode, a user can only operate application programs set in advance. For example, the application programs set in advance can be application programs which do not relate to privacy of the owner, such as turning on a camera or a flashlight application program.

In the operation 405, a pressure of a user inputting a fingerprint is acquired.

A pressure of a user inputting a fingerprint, which is detected by the pressure sensor, is acquired.

In one embodiment, it is possible to activate a camera to acquire biological characteristic information of a user, and match the biological characteristic information with a preset information template. Thus, according to the matching result, whether the touch chip is controlled to output the touch sensing control signal to the touch display screen is determined. Wherein, the biological characteristic information can be face characteristic information or the like. When detecting a fingerprint input, if face characteristic information is detected by a camera, it is considered that this fingerprint input is not a wrong operation, and the touch chip can be controlled to output the touch sensing control signal to the touch display screen.

In the operation 406, whether the pressure is within a preset pressure region is determined; if yes, the operation 407 is executed; otherwise, the operation 410 is executed.

Wherein, the preset pressure region can be configured by system default, and can also be set by users themselves. For example, the mobile terminal provides a pressure region adjustment function for users. When a user enters the pressure region adjustment function, the user is prompted to normally input a fingerprint for many times, pressures corresponding to these fingerprint input operations are recorded as the preset pressure region.

A pressure of a current user inputting a fingerprint is respectively compared with the minimum value and the maximum value of the preset pressure region. If the pressure is less than the minimum pressure value of the preset pressure region or larger than the maximum value of the preset pressure region, it is determined that the pressure is not within the preset pressure region. If the pressure is larger than the minimum pressure value of the preset pressure region and less than the maximum value of the preset pressure region, it is determined that the pressure is within the preset pressure region.

In the operation 407, the touch chip is controlled to output the touch sensing control signal to the touch display screen.

When the pressure of a current user inputting a fingerprint is within the preset pressure region, it is considered that the current fingerprint input operation is not a wrong operation, and the touch display screen is controlled to activate, so as to detect blank screen gestures.

In the operation 408, according to the fingerprint, an application program on which a user has an operation right is matched, and a set of blank screen gestures corresponding to the application program is acquired.

In the operation 409, a blank screen gesture event is reported to an application layer upon detection of a blank screen gesture belonging to the set of blank screen gestures to execute an operation corresponding to the blank screen gesture.

In the operation 410, that a wrong touch occurs is determined, and a touch sensing control signal is not output to the touch display screen.

When the pressure of a current user inputting a fingerprint is not within the preset pressure region, it is considered that the current fingerprint input operation is a wrong operation, and the touch sensing control signal is not output to the touch display screen.

The solution for reducing power consumption of a mobile terminal provided by an embodiment of the present disclosure comprises: before controlling the touch chip to output the touch sensing control signal to the touch display screen, acquiring a pressure of a user inputting a fingerprint; if the mobile terminal is in a user mode, determining whether the pressure is within a preset pressure region; according to the determining result, determining whether to control the touch chip to output the touch sensing control signal to the touch display screen; if the mobile terminal is in a guest mode, executing an operation of controlling the touch chip to output the touch sensing control signal to the touch display screen. By adopting the above technical solution, the condition that the touch display screen is mistakenly activated because of a wrong contact on the fingerprint recognition module, which results in increased power consumption of the mobile terminal, can be effectively avoided from occurring.

Figure 5:
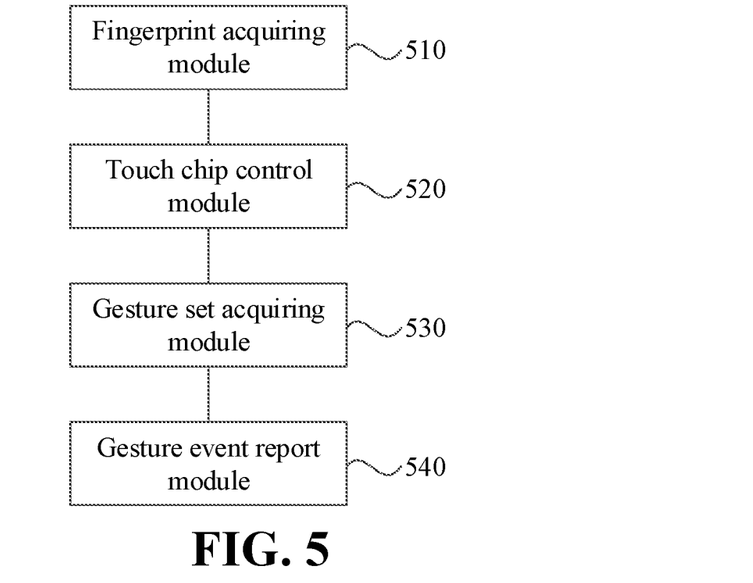
FIG. 5 is a structural block diagram of a device for reducing power consumption of a mobile terminal provided by an embodiment of the present disclosure.

FIG. 5 is a structural block diagram of a device for reducing power consumption of a mobile terminal provided by an embodiment of the present disclosure. The device can be implemented by software and/or hardware, and is generally integrated in a mobile terminal. As shown in FIG. 5, the device can comprise a fingerprint acquiring module 510, a touch chip control module 520, a gesture set acquiring module 530, and a gesture event report module 540.

The fingerprint acquiring module 510 is configured to: in a screen-off state, acquire a fingerprint detected by a fingerprint recognition module.

The touch chip control module 520 is configured to: if the fingerprint is a non-unlocking fingerprint, control a touch chip to output a touch sensing control signal to a touch display screen, wherein the touch sensing control signal is configured to enable the touch display screen to enter a working mode for detecting blank screen gestures.

The gesture set acquiring module 530 is configured to: according to the fingerprint, match an application program on which a user has an operation right, and acquire a set of blank screen gestures corresponding to the application program.

The gesture event report module 540 is configured to: report a blank screen gesture event to an application layer upon detection of a blank screen gesture belonging to the set of blank screen gestures to execute an operation corresponding to the blank screen gesture.

The technical solution of this embodiment provides a device for reducing power consumption of a mobile terminal. By adopting the above technical solution, the condition of increasing power consumption of the mobile terminal caused by the touch display screen working continuously can be avoided from occurring; at the same time, only a blank screen gesture corresponding to an application program matching with the current fingerprint can trigger report of a blank screen gesture event, and the condition that the application layer triggers a blank screen gesture event based on an invalid blank screen gesture and executes a gesture data reading operation, which results in doing idle working, is further avoided from occurring; in this way, the power consumption of the mobile terminal can be effectively reduced, and the battery life can be extended.

In one embodiment, the device further comprises a state control module configured to: before acquiring a fingerprint detected by the fingerprint recognition module, if a blank screen gesture function has been enabled and the mobile terminal is in the screen-off state, control the fingerprint recognition module to enter a working mode for detecting fingerprints, and control the touch display screen to enter a non-working which cannot detect blank screen gestures.

Furthermore, the device further comprises a mode switching module configured to: after controlling the touch chip to output the touch sensing control signal to the touch display screen, if no blank screen gesture input is detected in a set time length, control the touch chip to stop outputting the touch sensing control signal to the touch display screen, so that the touch display screen enters the non-working mode again.

In one embodiment, the device further comprises a fault tolerant module configured to: after acquiring the set of blank screen gestures corresponding to the application program, if the detected blank screen gesture does not belong to the set of blank screen gestures, prompt a user that the blank screen gesture input is wrong, and record the number of times of wrong blank screen gesture inputs; when the number of times exceeds a set threshold value of the number of times, control the touch chip to stop outputting the touch sensing control signal to the touch display screen, and make the touch display screen to quit the working mode.

In one embodiment, the device further comprises a mode determining module configured to: after acquiring the fingerprint detected by the fingerprint recognition module, determine whether the fingerprint pattern and the fingerprint template stored in advance match successfully; if matching successfully, determine that the mobile terminal is in a user mode; otherwise, determine that the mobile terminal is in a guest mode.

In one embodiment, the device further comprises a first anti-misoperation module configured to: before controlling the touch chip to output the touch sensing control signal to the touch display screen, acquire a pressure of the user inputting the fingerprint; if the mobile terminal is in the user mode, determine whether the pressure is within a preset pressure region; according to the determining result, determine whether to control the touch chip to output the touch sensing control signal to the touch display screen; if the mobile terminal is in the guest mode, execute an operation of controlling the touch chip to output the touch sensing control signal to the touch display screen.

In one embodiment, the device further comprises a second anti-misoperation module configured to: before controlling the touch chip to output the touch sensing control signal to the touch display screen, activate a camera to acquire biological characteristic information of the user, and match the biological characteristic information with a preset information template; according to the matching result, determine whether to control the touch chip to output the touch sensing control signal to the touch display screen.

In one embodiment, the gesture set acquiring module 530 is specifically configured to: if the fingerprint and the preset fingerprint template match successfully, inquire a white list storing relationships between the fingerprint template and application programs, and determine application programs on which the user has operation right; if the fingerprint and the preset fingerprint template fail to match, take preset application programs as application programs on which the user has operation right.

An embodiment of the present disclosure further provides a storage medium including computer executable instruction, the computer executable instruction, when being executed by a computer processor, is configured to execute a method for reducing power consumption of a mobile terminal. The method comprises: in a screen-off state, acquiring a fingerprint detected by a fingerprint recognition module; if the fingerprint is a non-unlocking fingerprint, controlling a touch chip to output a touch sensing control signal to a touch display screen, wherein the touch sensing control signal is configured to enable the touch display screen to enter a working mode for detecting blank screen gestures; according to the fingerprint, matching an application program on which a user has an operation right, and acquiring a set of blank screen gestures corresponding to the application program; reporting a blank screen gesture event to an application layer upon detection of a blank screen gesture belonging to the set of blank screen gestures to execute an operation corresponding to the blank screen gesture.

Storage medium—means any of various types of memory devices or storage devices. The term "storage medium" is intended to include: an installation medium, such as a read-only optical disc (CD-ROM), a floppy disk, or a tape device; a computer system memory or a random access memory, such as a dynamic random access memory (DRAM), a double rate synchronous dynamic random access memory (DDR RAM), a static random access memory (SRAM), an expanded data output random access memory (EDO RAM), a Rambus random access memory (Rambus RAM), etc.; a non-transitory memory, such as a flash memory, a magnetic medium (such as a hard disk or an optical storage); registers or other similar types of memory elements, and the like. The storage medium may also include other types of memories or combinations thereof. Additionally, the storage medium may be located in a first computer system in which a program is executed, or may be located in a different second computer system, wherein the second computer system is coupled to the first computer system via a network, such as the Internet. The second computer system can provide program instruction to the first computer system for execution. The term "storage medium" can include two or more storage media that can reside in different locations (e.g., in different computer systems connected through a network). A storage medium may store program instruction (e.g., embodied as a computer program) being executable by one or more processors.

Of course, in the storage medium including computer executable instruction provided by the embodiment of the present disclosure, the computer executable instruction is not limited to the aforementioned operations of implementing the method for reducing power consumption of a mobile terminal, and can also execute related operations in a method for reducing power consumption of a mobile terminal provided by any embodiment of the present disclosure.

Figure 6:
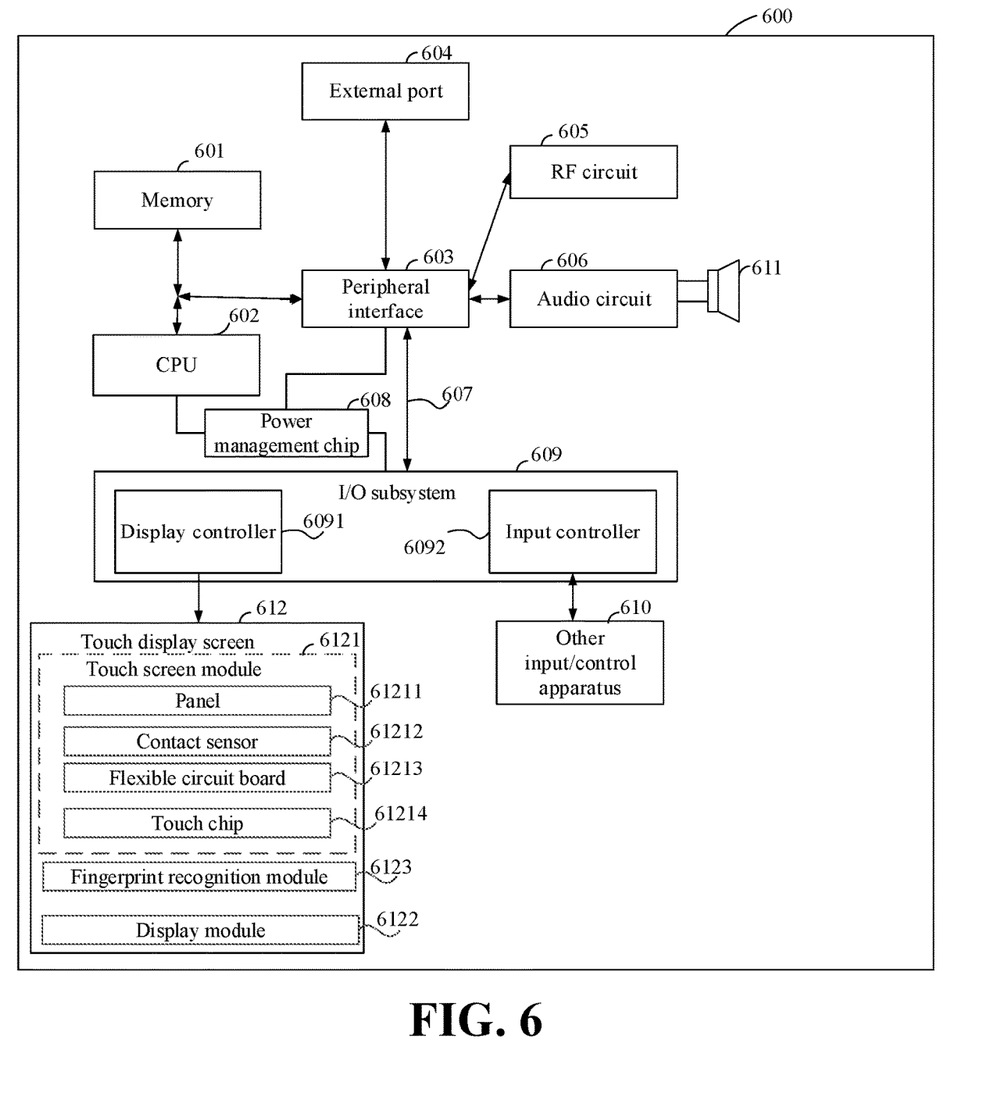
FIG. 6 is a structural schematic view of a mobile terminal provided by an embodiment of the present disclosure.

An embodiment of the present disclosure provides a mobile terminal, the mobile terminal integrates a device for reducing power consumption of a mobile terminal provided by an embodiment of the present disclosure therein. For example, the mobile terminal in this embodiment can specifically be a terminal such as a mobile phone, a tablet computer, etc. FIG. 6 is a structural schematic view of a mobile terminal provided by an embodiment of the present disclosure. As shown in FIG. 6, the mobile terminal can comprise: a housing (not shown in the figures), a memory 601, a central processing unit (CPU) 602 (Also known as processor, hereinafter referred to as CPU), a circuit board (not shown in the figures), a touch display screen 612, a touch chip 61214, a fingerprint recognition module 61212, and a power supply circuit (not shown in the figures). The touch display screen 612 is configured to convert a user's operation into an electric signal input to the processor, and display a visible output signal; the touch display screen includes the touch chip 61214, the touch chip 61214 is configured to output a touch sensing control signal to the touch display screen 612 under control of the processor, and thereby make the touch display screen 612 be in a working mode for detecting touch operations; the fingerprint recognition module 61212 is disposed inside the touch display screen 612, and configured to detect fingerprints input by users; the circuit board is disposed in space enclosed by the touch display screen 612 and the housing; the CPU 602 and the memory 601 are disposed on the circuit board; the power supply circuit is configured to supply power to various circuits or elements of the mobile terminal; the memory 601 is configured to store association relationships among blank screen gestures, fingerprints, and application programs, and store a computer program being executable in a processor; the CPU 602 reads and executes the computer program stored in the memory 601. The CPU 602, when executing the computer program, implements the following steps: in a screen-off state, acquiring a fingerprint detected by a fingerprint recognition module; if the fingerprint is a non-unlocking fingerprint, controlling a touch chip to output a touch sensing control signal to a touch display screen, wherein the touch sensing control signal is configured to enable the touch display screen to enter a working mode for detecting blank screen gestures; according to the fingerprint, matching an application program on which a user has an operation right, and acquiring a set of blank screen gestures corresponding to the application program; reporting a blank screen gesture event to an application layer upon detection of a blank screen gesture belonging to the set of blank screen gestures to execute an operation corresponding to the blank screen gesture.

The mobile terminal further comprises: a peripheral interface 603, an RF (Radio Frequency) circuit 605, an audio circuit 606, a speaker 611, a power management chip 608, an input/output (I/O) subsystem 609, another input/control apparatus 610, and an external port 604, these elements communicate through one or more communication bus or signal line 607.

It should be understood that the mobile terminal 600 shown in the figures is merely one example of the mobile terminal, and the mobile terminal 600 can have more or less elements than that shown in the figures, can combine two or more elements, or can have different element configurations. The various elements shown in the figures can be implemented in hardware including one or more signal processing and/or special integrated circuit therein, software, or a combination of hardware and software.

The mobile terminal with a device for reducing power consumption of a mobile terminal integrated therein provided by this embodiment is described in detail below. The mobile terminal takes a mobile phone as example.

The memory 601. The memory 601 can be accessed by the CPU 602, the peripheral interface 603, etc. The memory 601 can include a high speed random access memory, and can also include a non-transitory memory, for example, one or more disk storage device, flash memory device, or other non-transitory solid state storage device.

The peripheral interface 603. The peripheral interface 603 can connect input and output peripheral devices of the device to the CPU 602 and the memory 601.

The I/O subsystem 609. The I/O subsystem 609 can connect the input and output peripheral devices of the device, such as the touch display screen 612 and the other input/control apparatus 610, to the peripheral interface 603. The I/O subsystem 609 can include a display controller 6091 and one or more input controllers 6092 configured to control the other input/control apparatus 610. Wherein, the one or more input controllers 6092 receive(s) electric signals from the other input/control apparatus 610 or send(s) electric signals to the other input/control apparatus 610. The other input/control apparatus 610 can include a physical button (push button, rocker button, etc.), a dial, a slide switch, a joystick, a click wheel, etc. It should be noted that the input controller 6092 can be connected with any one of the following: a keyboard, an infrared port, a USB interface, and an indication apparatus such as a mouse.

The touch display screen 612. The touch display screen 612 is an input interface and an output interface between a user terminal and a user. For example, the touch display screen includes a display module 6122, a fingerprint recognition module 6123, and a touch screen module 6121; wherein, the touch screen module 6121 includes a panel 61211, a contact sensor 61212, a flexible circuit board 61213, and a touch chip 61214. Wherein, the panel 61211 is a surface layer of the touch screen module 6121, contact operations of users act on the panel 61211. According the structure of the touch screen module 6121 and the design requirement for the touch chip 61214, the contact sensor 61212 is manufactured. The contact sensor 61212 is electrically connected with the touch chip 61214 through the flexible circuit board 61213. The touch screen module 6121 can detect touch operations, the display module 6122 can display visible output to users, the visible output includes graphics, texts, icons, videos, etc.

It should be noted that the fingerprint recognition module can be disposed inside the touch screen module, and can also be disposed to be independent from the touch screen module, for example, disposed at a bottom of the touch screen module.

The display controller 6091 of the I/O subsystem 609 receives electric signals from the touch display screen 612 or sends electric signals to the touch display screen 612. The touch display screen 612 detect contacts on the touch display screen, the display controller 6091 converts detected contacts into interactions with user interface objects displayed on the touch screen display 612, that is, implement man-machine interaction. The user interface objects displayed on the touch display screen 612 can be an icon of a running game, an icon of connecting with a corresponding network, etc. It should be noted that the device can further include an optical mouse, the optical mouse is a touch sensitive surface which does not display any visible output, or extension of a touch sensitive surface formed by the touch screen module.

The RF circuit 605 is mainly configured to establish communication between the mobile phone and a wireless network (i.e., network side), and implement data reception and transmission between the mobile phone and the wireless network, such as receiving and sending short messages, emails, etc. In particular, the RF circuit 605 receives and sends RF signals, the RF signals are also called as electromagnetic signals; the RF circuit 605 converts electric signals into electromagnetic signals or converts electromagnetic signals into electric signals, and communicates with a communication network and other devices by the electromagnetic signals. The RF circuit 605 can include known circuits configured to execute these functions, which include but are not limited to an antenna system, an RF transceiver, one or more amplifier(s), a tuner, one or more oscillator(s), a digital signal processor, a CODEC (COder-DECoder) chip group, a subscriber identity module (SIM), and so on.

The audio circuit 606 is mainly configured to receive audio data from the peripheral interface 603, convert the audio data into electric signals, and send the electric signal to the speaker 611.

The speaker 611 is configured to restore voice signals received from the wireless network through the RF circuit 605 by the mobile phone into sounds, and broadcast the sounds to users.

The power management chip 608 is configured to supply power and perform power supply management for the CPU 602, the I/O subsystem, and hardware connected to the peripheral interface.

The mobile terminal provided by this embodiment of the present disclosure can effectively reduce power consumption of a mobile phone and extend a battery life.

The device for reducing power consumption of a mobile terminal, the storage medium, and the mobile terminal provided by the above embodiments can execute the method for reducing power consumption of a mobile terminal provided by any embodiment of the present disclosure, and have corresponding functional modules for executing the method and advantageous effect. Technical details which are not described in detail in the above embodiments can refer to the method for reducing power consumption of a mobile terminal provided by any embodiment of the present disclosure.

What is claimed is:

1. A method for reducing power consumption of a mobile terminal, comprising:
   in a screen-off state, acquiring a fingerprint detected by a fingerprint recognition module;
   based on a determination that the fingerprint is a non-unlocking fingerprint, controlling a touch chip to output a touch sensing control signal to a touch display screen, wherein the touch sensing control signal is configured to enable the touch display screen to enter a working mode for detecting blank screen gestures;
   according to the fingerprint, matching an application program on which a user has an operation right, and acquiring a set of blank screen gestures corresponding to the application program; and
   reporting a blank screen gesture event to an application layer upon detection of a blank screen gesture belonging to the set of blank screen gestures to execute an operation corresponding to the blank screen gesture.

2. The method according to claim 1, wherein the method further comprises:
   before acquiring the fingerprint detected by the fingerprint recognition module,
   based on a determination that a blank screen gesture function has been enabled and the mobile terminal is in the screen-off state, controlling the fingerprint recognition module to enter a working mode for detecting fingerprints, and controlling the touch display screen to enter a non-working mode which cannot detect blank screen gestures.

3. The method according to claim 2, wherein the method further comprises:
   after controlling the touch chip to output the touch sensing control signal to the touch display screen,
   based on a determination that no blank screen gesture input is detected in a set time length, controlling the touch chip to stop outputting the touch sensing control signal to the touch display screen, and making the touch display screen enter the non-working mode again.

4. The method according to claim 1, wherein the method further comprises:
   after acquiring the set of blank screen gestures corresponding to the application program:
   based on a determination that a detected blank screen gesture does not belong to the set of blank screen gestures, prompting a user that the blank screen gesture input is wrong, and recording the number of times of wrong blank screen gesture inputs; and when the number of times exceeds a set threshold value of the number of times, controlling the touch chip to stop outputting the touch sensing control signal to the touch display screen, and making the touch display screen quit the working mode.

5. The method according to claim 4, wherein, prompting the user that the blank screen gesture input is wrong includes at least one of driving of the mobile terminal to vibrate for a set number of times or sending set prompt sound, and different numbers of times of vibration of the mobile terminal indicate different error types of the wrong blank screen gesture input.

6. The method according to claim 1, wherein the method further comprises:
after acquiring the fingerprint detected by the fingerprint recognition module,
determining whether a fingerprint pattern and a fingerprint template stored in advance match successfully; based on a determination that matching is successful, determining that the mobile terminal is in the user mode; otherwise, determining that the mobile terminal is in a guest mode.

7. The method according to claim 6, wherein the method further comprises:
before controlling the touch chip to output the touch sensing control signal to the touch display screen:
acquiring a pressure of a user inputting the fingerprint;
based on the determination that the mobile terminal is in the user mode, determining whether the pressure is within a preset pressure region; and
according to a result of determining whether the pressure is within the preset pressure region, determining whether to control the touch chip to output the touch sensing control signal to the touch display screen.

8. The method according to claim 6, wherein the method further comprises:
before controlling the touch chip to output the touch sensing control signal to the touch display screen,
based on a determination that the mobile terminal is in the guest mode, executing an operation of controlling the touch chip to output the touch sensing control signal to the touch display screen.

9. The method according to claim 1, wherein the method further comprises:
before controlling the touch chip to output the touch sensing control signal to the touch display screen:
activating a camera to acquire biological characteristic information of the user, and matching the biological characteristic information with a preset information template; and
according to a result of matching the biological characteristic information with the preset information template, determining whether to control the touch chip to output the touch sensing control signal to the touch display screen.

10. The method according to claim 9, wherein, the biological characteristic information includes face characteristic information, and the method further comprises:
when detecting a fingerprint input, based on a determination that face characteristic information is detected by the camera, determining that this fingerprint input is not a wrong operation, and controlling the touch chip to output the touch sensing control signal to the touch display screen.

11. The method according to claim 1, wherein, according to the fingerprint, matching the application program on which the user has the operation right comprises:
based on a determination that the fingerprint is successfully matched with a fingerprint template stored in advance, inquiring a first white list storing an association relationship between the fingerprint template and application programs, and determining the application programs on which the user has operation right; and
based on a determination that the fingerprint fails to match with the fingerprint template stored in advance, using preset application programs as the application programs on which the user has operation right.

12. The method according to claim 11, wherein, acquiring the set of blank screen gestures corresponding to the application program comprises:
according to the application program on which a user has an operation right, inquiring a second white list storing association relationships between blank screen gestures and application programs or mobile phone functions to determine the set of blank screen gestures corresponding to the application program.

13. A non-transitory computer readable storage medium, which stores a computer program; wherein, the computer program, when being executed by a processor, implements a method for reducing power consumption of a mobile terminal, and the method comprising:
in a screen-off state, acquiring a fingerprint detected by a fingerprint recognition module;
based on a determination that the fingerprint is a non-unlocking fingerprint, controlling a touch chip to output a touch sensing control signal to a touch display screen, wherein the touch sensing control signal is configured to enable the touch display screen to enter a working mode for detecting blank screen gestures;
according to the fingerprint, matching an application program on which a user has an operation right, and acquiring a set of blank screen gestures corresponding to the application program; and
reporting a blank screen gesture event to an application layer upon detection of a blank screen gesture belonging to the set of blank screen gestures to execute an operation corresponding to the blank screen gesture.

14. A mobile terminal, comprising:
a processor;
a fingerprint recognition module configured to detect a finger input by a user;
a memory configured to store association relationships among blank screen gestures, fingerprints, and application programs, and store a computer program being executable in the processor; and
a touch display screen including a touch chip and configured to detect a blank screen gesture and display a gesture track of the blank screen gesture;
wherein, the touch chip is configured to output a touch sensing control signal to the touch display screen under control of the processor; and
the processor is configured to implement a method for reducing power consumption of a mobile terminal when executing the computer program, the method comprising:
in a screen-off state, acquiring a fingerprint detected by a fingerprint recognition module;
based on a determination that the fingerprint is a non-unlocking fingerprint, controlling a touch chip to output a touch sensing control signal to a touch display screen, wherein the touch sensing control signal is configured to enable the touch display screen to enter a working mode for detecting blank screen gestures;

according to the fingerprint, matching an application program on which a user has an operation right, and acquiring a set of blank screen gestures corresponding to the application program; and reporting a blank screen gesture event to an application layer upon detection of a blank screen gesture belonging to the set of blank screen gestures to execute an operation corresponding to the blank screen gesture.

15. The mobile terminal according to claim 14, further comprising:

a peripheral interface configured to connect the touch display screen to the processor and the memory; and an input/output (I/O) subsystem configured to connect the touch display screen to the peripheral interface;

wherein, the I/O subsystem includes a display controller configured to receive electric signals from and send electric signals to the touch display screen and one or more input controllers configured to control an other input/control apparatus of the mobile terminal.

16. The mobile terminal according to claim 14, further comprising a device for reducing power consumption of a mobile terminal integrated therein, wherein, the device for reducing power consumption of a mobile terminal comprises:

a fingerprint acquiring module configured to: in a screen-off state, acquire a fingerprint detected by a fingerprint recognition module;

a touch chip control module configured to: based on a determination that the fingerprint is a non-unlocking fingerprint, control a touch chip to output a touch sensing control signal to a touch display screen, wherein the touch sensing control signal is configured to enable the touch display screen to enter a working mode for detecting blank screen gestures;

a gesture set acquiring module configured to: according to the fingerprint, match an application program on which a user has an operation right, and acquire a set of blank screen gestures corresponding to the application program; and a gesture event reporting module configured to: report a blank screen gesture event to an application layer upon detection of a blank screen gesture belonging to the set of blank screen gestures to execute an operation corresponding to the blank screen gesture.

17. The mobile terminal according to claim 16, wherein, the device for reducing power consumption of a mobile terminal further comprises:

a state control module configured to: before acquiring a fingerprint detected by the fingerprint recognition module, based on a determination that a blank screen gesture function has been enabled and the mobile terminal is in the screen-off state, control the fingerprint recognition module to enter a working mode for detecting fingerprints, and control the touch display screen to enter a non-working which cannot detect blank screen gestures; and a mode switching module configured to: after controlling the touch chip to output the touch sensing control signal to the touch display screen, based on a determination that no blank screen gesture input is detected in a set time length, control the touch chip to stop outputting the touch sensing control signal to the touch display screen, so that the touch display screen enters the non-working mode again.

18. The mobile terminal according to claim 16, wherein, the device for reducing power consumption of a mobile terminal further comprises:

a fault tolerant module configured to: after acquiring the set of blank screen gestures corresponding to the application program, based on a determination that the detected blank screen gesture does not belong to the set of blank screen gestures, prompt a user that the blank screen gesture input is wrong, and record the number of times of wrong blank screen gesture inputs; when the number of times exceeds a set threshold value of the number of times, control the touch chip to stop outputting the touch sensing control signal to the touch display screen, and make the touch display screen to quit the working mode.

19. The mobile terminal according to claim 16, wherein, the device for reducing power consumption of a mobile terminal further comprises:

a mode determining module configured to: after acquiring the fingerprint detected by the fingerprint recognition module, determine whether the fingerprint pattern and the fingerprint template stored in advance match successfully; based on a determination that matching is successfully, determine that the mobile terminal is in a user mode; based on a determination that matching is not successfully, determine that the mobile terminal is in a guest mode.

20. The mobile terminal according to claim 19, wherein, the device for reducing power consumption of a mobile terminal further comprises:

a first anti-misoperation module configured to: before controlling the touch chip to output the touch sensing control signal to the touch display screen, acquire a pressure of the user inputting the fingerprint; based on the determination that the mobile terminal is in the user mode, determine whether the pressure is within a preset pressure region; according to a result of determining whether the pressure is within the preset pressure region, determine whether to control the touch chip to output the touch sensing control signal to the touch display screen; based on the determination that the mobile terminal is in the guest mode, execute an operation of controlling the touch chip to output the touch sensing control signal to the touch display screen.

* * * * *